Figure 1A:
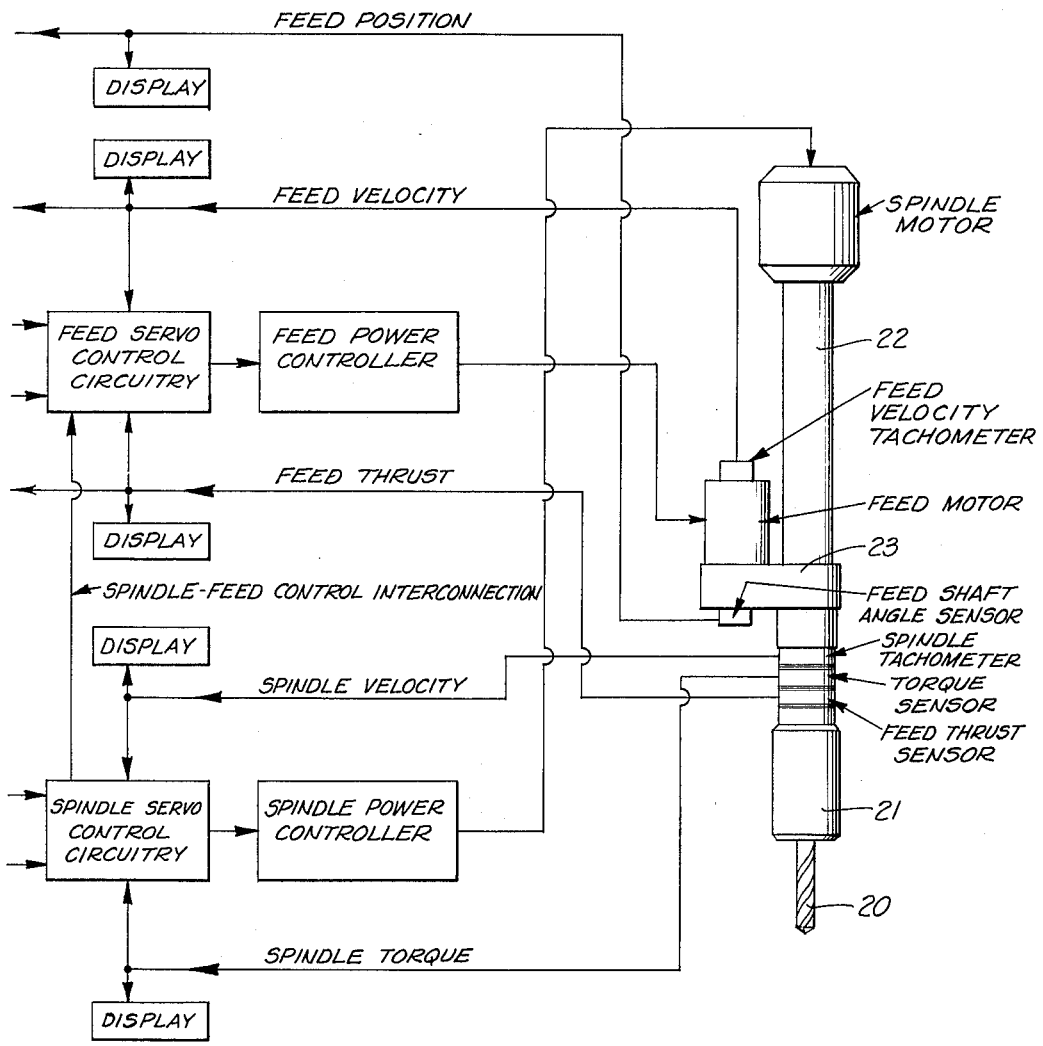

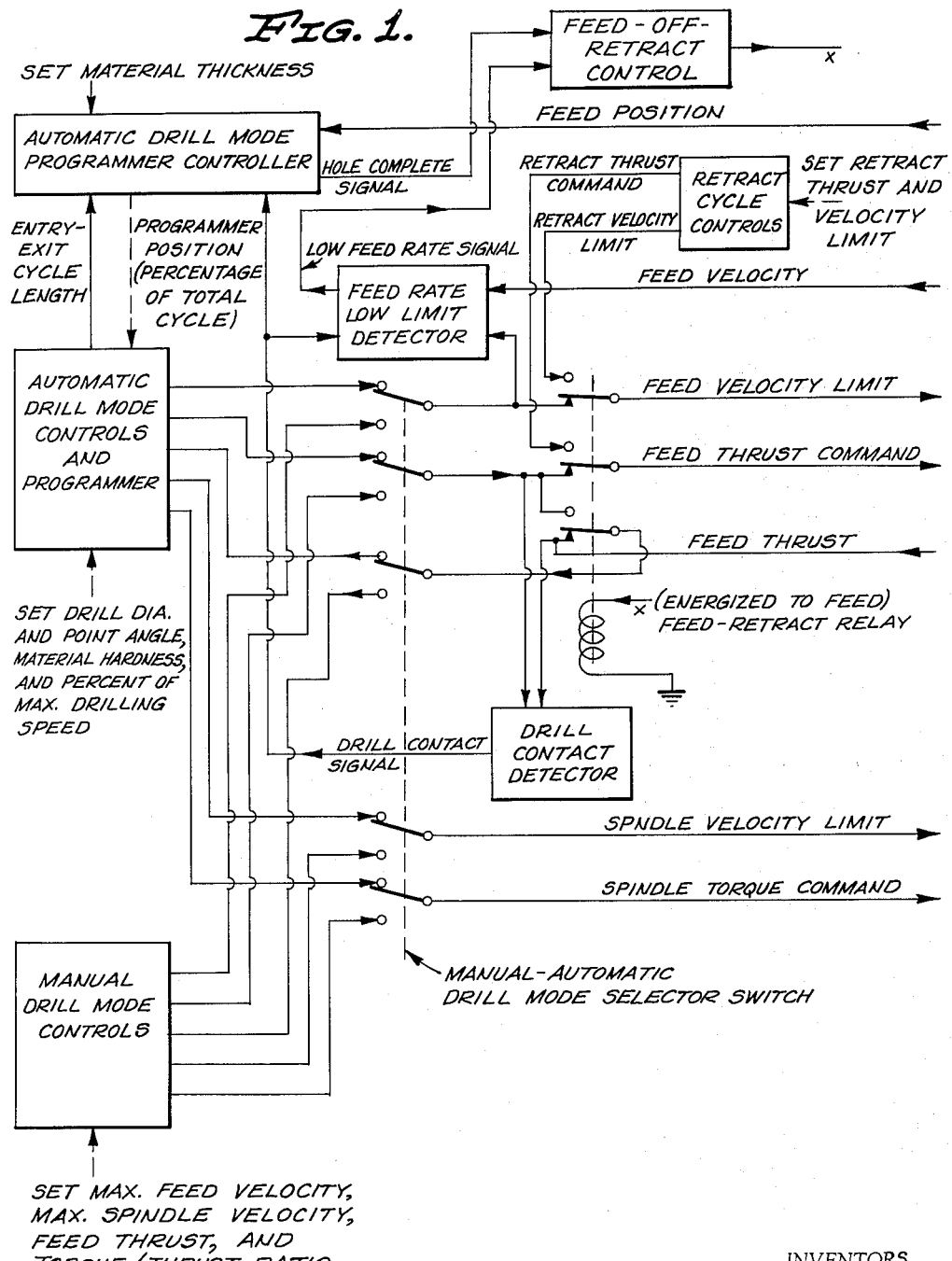

July 5, 1966  R. F. RIEGER ETAL  3,259,023
METAL WORKING MACHINE AND MACHINING PROCESS
Filed Jan. 8, 1965  7 Sheets-Sheet 2

INVENTORS
RICHARD F. RIEGER,
THOMAS W. SCHAFER,
IVAN DALE WELLS
BY THEIR ATTORNEYS
HARRIS, KIECH, RUSSELL & KERN

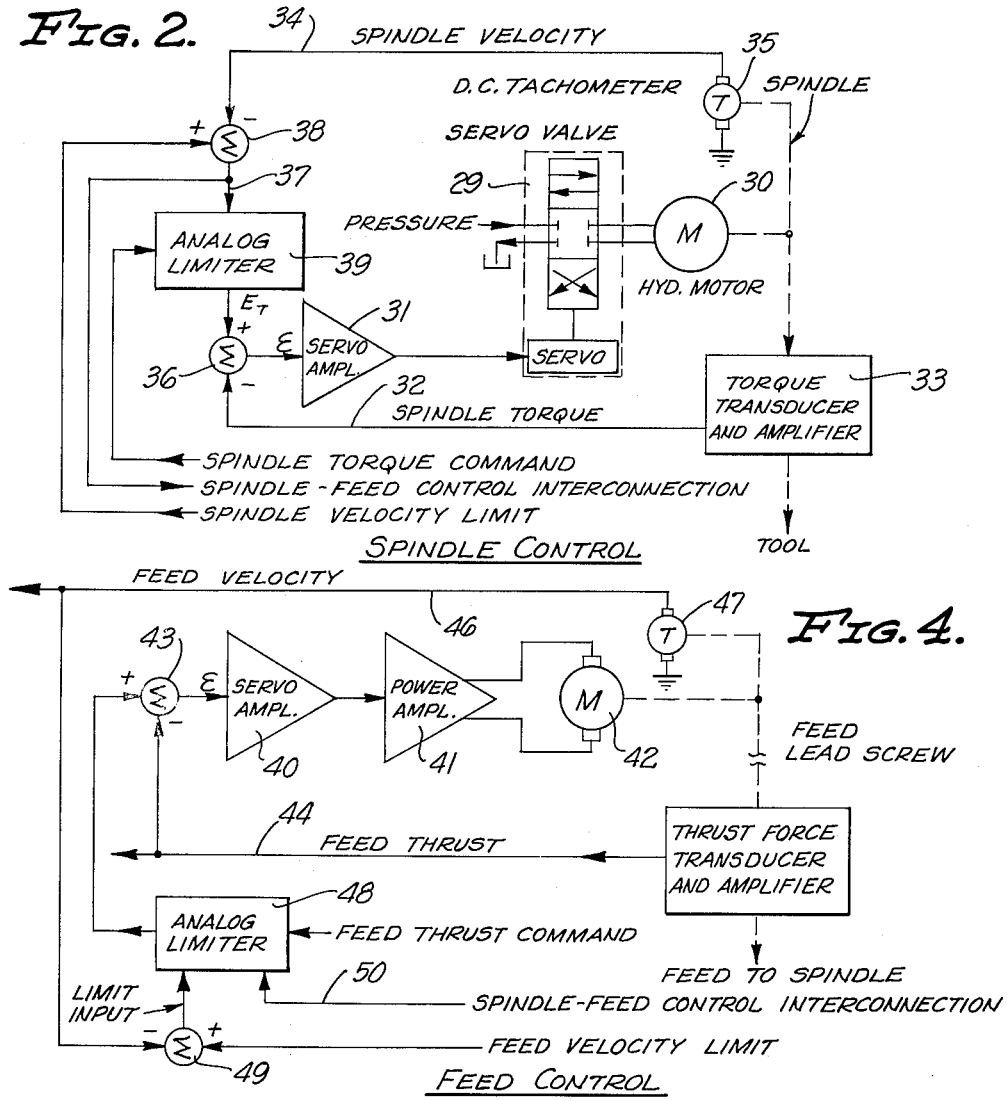
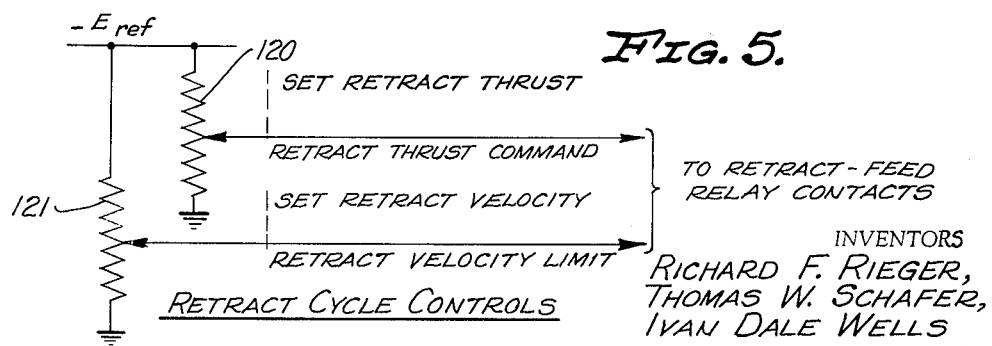

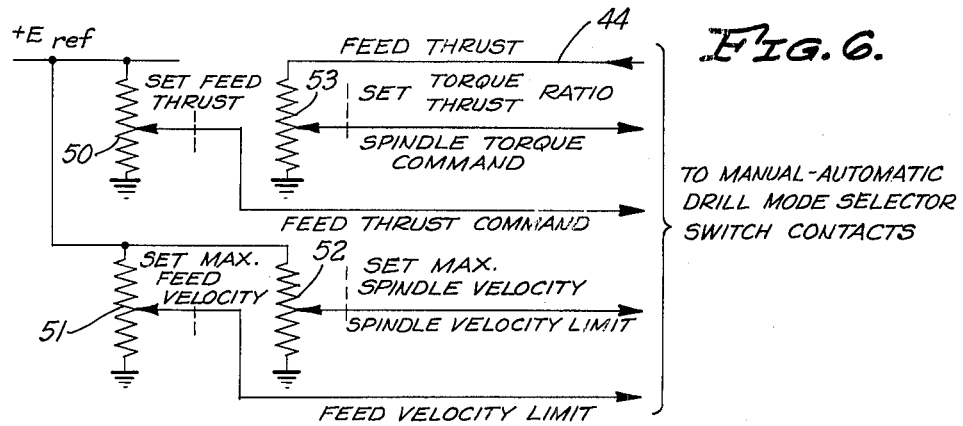
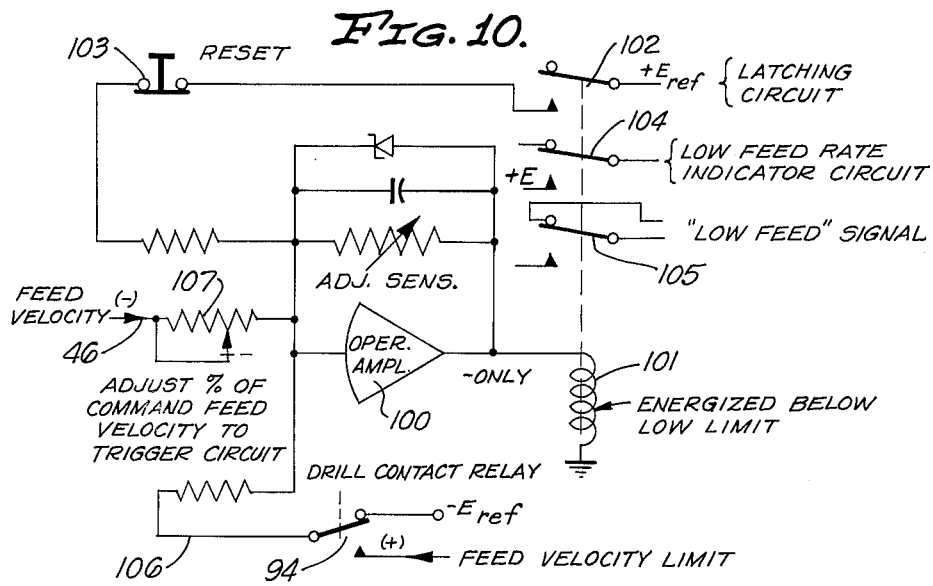
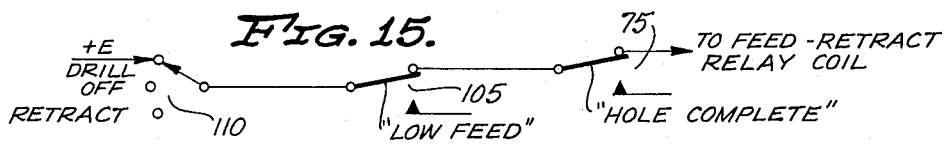

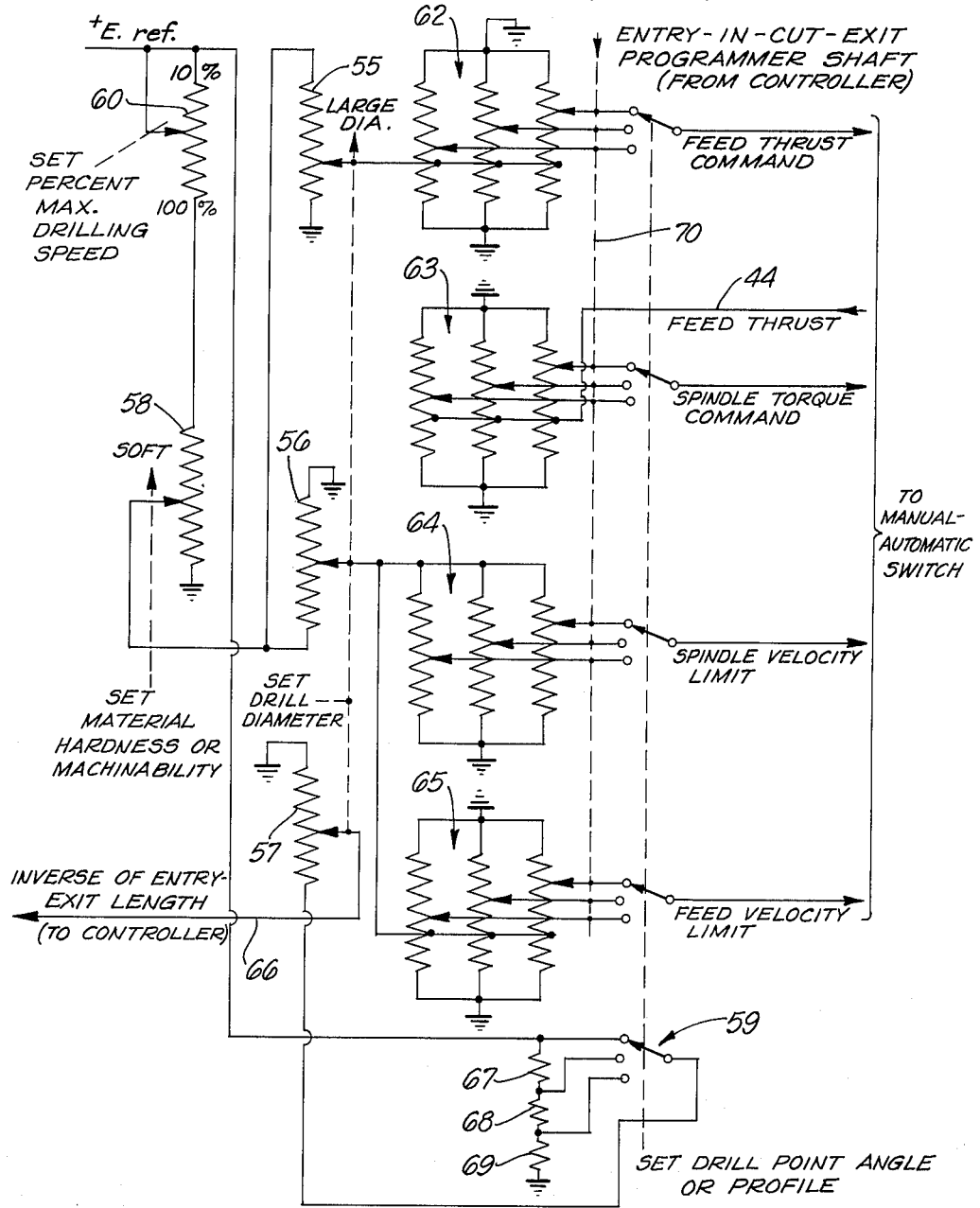

Mode Programmer Controller

Drill Contact Detector

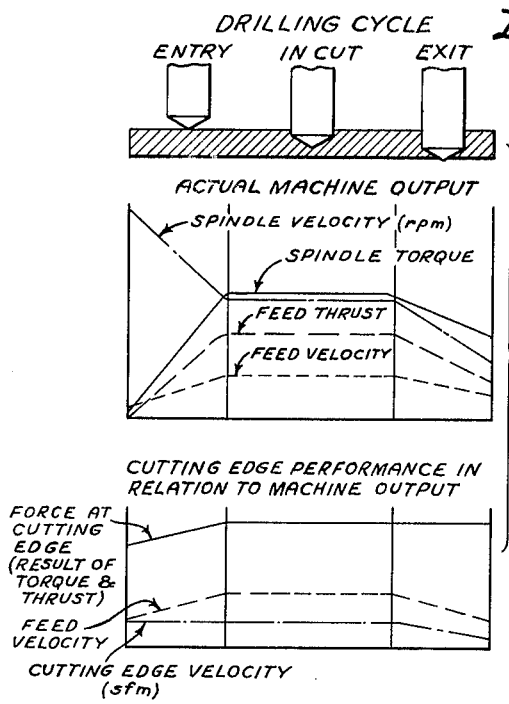
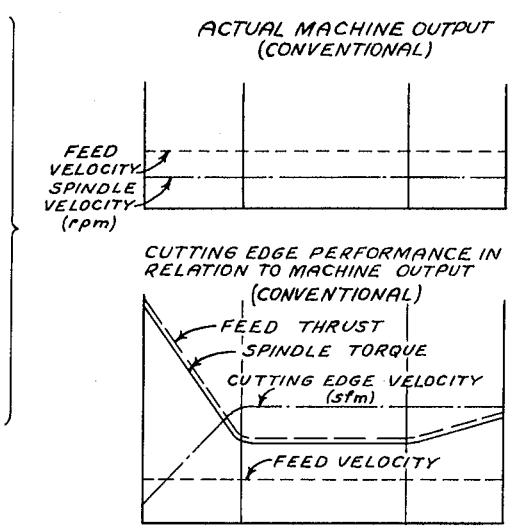
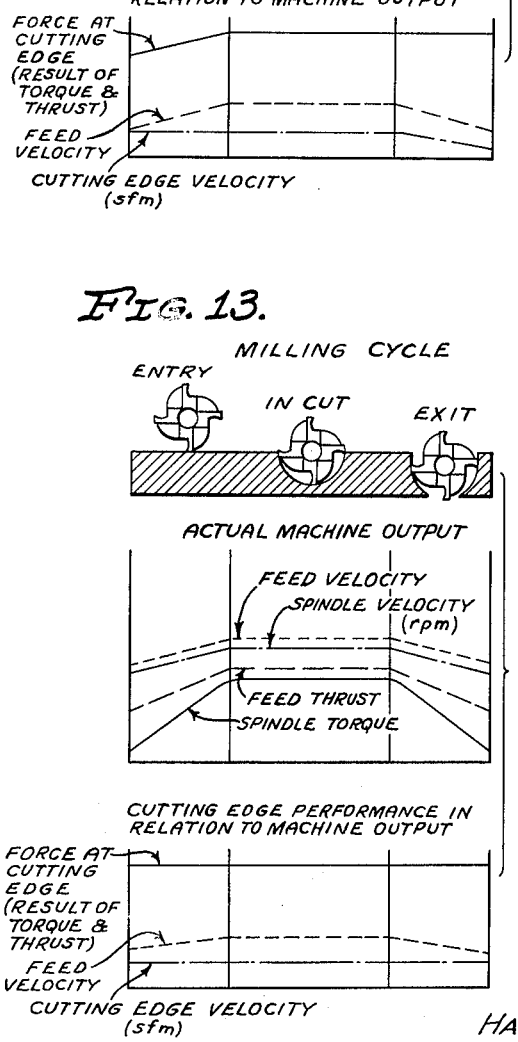
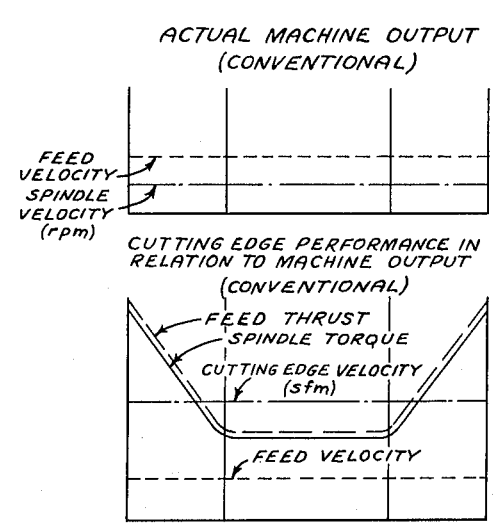
INVENTORS
RICHARD F. RIEGER,
THOMAS W. SCHAFER,
IVAN DALE WELLS
BY THEIR ATTORNEYS
HARRIS, KIECH, RUSSELL & KERN

United States Patent Office 3,259,023
Patented July 5, 1966

3,259,023
METAL WORKING MACHINE AND MACHINING PROCESS
Richard F. Rieger, Bonita, Thomas W. Schafer, Chula Vista, and Ivan Dale Wells, National City, Calif., assignors to Applied Machine Research Inc., El Cajon, Calif., a corporation of California
Filed Jan. 8, 1965, Ser. No. 424,362
19 Claims. (Cl. 90—13.5)

This invention relates to machine tools and metal working processes and, in particular, to new and improved controls for cutting tools such as drills and mills.

It is an object of the present invention to provide a metal working machine in which the machine drives are related to conditions at the cutting edge of the tool rather than being related to the performance of the drive units themselves as in conventional machines. During a cutting cycle, the tool works under widely differing conditions during the various stages of the cycle. The working conditions vary over a wide range during the tool entry stage and again during the tool exit stage. In the intermediate incut stage, the working conditions are nominally constant but variations in the material being worked result in changing conditions during the incut stage also. It is an object of the invention to provide a metal working machine for maintaining the optimum geometric path for the cutting edge of the tool for the various cutting conditions occuring during the work cycle.

The optimum values of feed thrust, feed velocity, spindle torque, and spindle velocity as related to the cutting edge in contact for any particular tool and material can be determined by analysis and testing. Some of these parameters are interrelated and will differ greatly when considered with reference to the tool cutting edge and with reference to the machine drive. It is an object of the invention to provide a metal working machine including means for generating the command signals for the machine drive units to produce the desired working characteristics at the cutting edge. A further object is to provide a machine incorporating controls for automatically operating the drive units to maintain the desired operating conditions.

It is an object of the invention to provide a metal working machine in which the tool and material characteristics such as tool profile, tool size, material machinability and material thickness or hole depth, can be set for any specific job. A further object is to provide a metal working machine in which the torque and thrust and velocity parameters can be generated as commands and/or limits for servo-controlled drive units. An additional object is to provide such a machine in which the optimum values of torque, thrust and velocities for various tool designs, tool sizes, and materials can be predetermined and stored in memories such as potentiometer banks, computers with digital or analog storage, punch cards, and the like.

It is a particular object of the invention to provide a metal working machine in which the feed thrust is programmed and is varied as a function of penetration of the tool into the work piece to maintain the optimum thrust at the cutting edge. A further object is to provide such a machine in which the spindle torque is programmed as a proportion of the feed thrust with the thrust-torque proportionality figure being varied as a function of tool penetration during entry and exit and being constant during incut. An additional object is to provide such a machine in which the spindle velocity and feed velocity are controlled so as to maintain the two velocities in proportion to produce a straight geometric path for the cutting edge. The proportionality factor will change with the tool profile and the change in tool profile which occurs during the entry and exit stages. Upper limits are normally provided for the velocities and the actual velocities may be reduced automatically to maintain the desired tool path when a tool dulls or a harder spot is encountered in the material being machined.

It is an object of the invention to provide a metal working machine for moving a cutting tool through a work piece and including a spindle having means for carrying a cutting tool therein, first drive means for advancing the spindle, second drive means for rotating the spindle, means for sensing the torque of the spindle, means for sensing the advance feed thrust of the spindle, first control means having the output of the feed thrust sensing means as an input and providing an output to the first drive means for varying the output thereof to maintain the feed thrust substantially equal to a predetermined value, and second control means having the output of the torque sensing means as an input and providing an output to the second drive means for varying the output thereof to maintain the spindle torque substantially equal to a command value. A further object is to provide such a machine in which the command value for the spindle torque is a predetermined proportion of the feed thrust.

It is an object of the invention to provide such a machine incorporating means for sensing the advance of the spindle to determine the entry, incut and exit stages and control means having the spindle advance sensing means as an input for varying the predetermined thrust value as a function of the stage of the operation cycle. A further object is to provide such a machine including means for varying the thrust-torque proportion as a function of the stage of the operation cycle.

It is an object of the invention to provide such a machine including means for sensing the rotational velocity of the spindle and means for sensing the advance feed velocity of the spindle. An additional object of the invention is to provide such a machine in which the control means includes limiters for maintaining the rotational and feed velocities within predetermined limits and in a predetermined proportion. An additional object is to provide such a machine in which the command limits and proportion are varied as a function of the stage of the cutting cycle so as to maintain the optimum velocities at the cutting edge.

The process of the present application contemplates the determination of the tool geometry best suited to the material and production situation, the provision of a cutting force which is constant with respect to the unit edge area of cutter in contact with the work, and the provision of a cutter geometric path requiring the least work per unit volume of material removed.

While the embodiment to be described herein will be for drilling, the invention is equally applicable to other machining operations using curvilinear tools, such as milling, and it is an object of the invention to provide a new and improved metal working machine and method which can be used for curvilinear tools in general.

The invention also comprises novel details of construction and novel combinations and arrangements of parts, which will more fully appear in the course of the following description. The drawings merely show and the description merely describes preferred embodiments of the present invention which are given by way of illustration or example.

Figure 3:
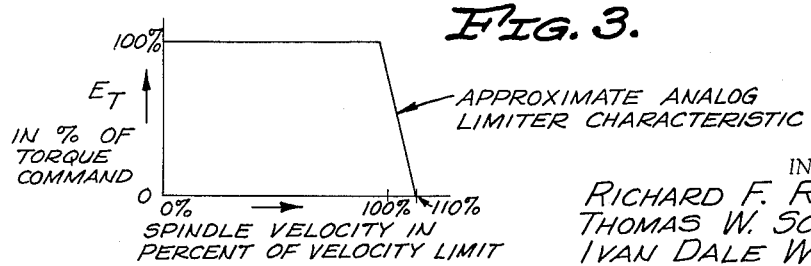
Figure 8:
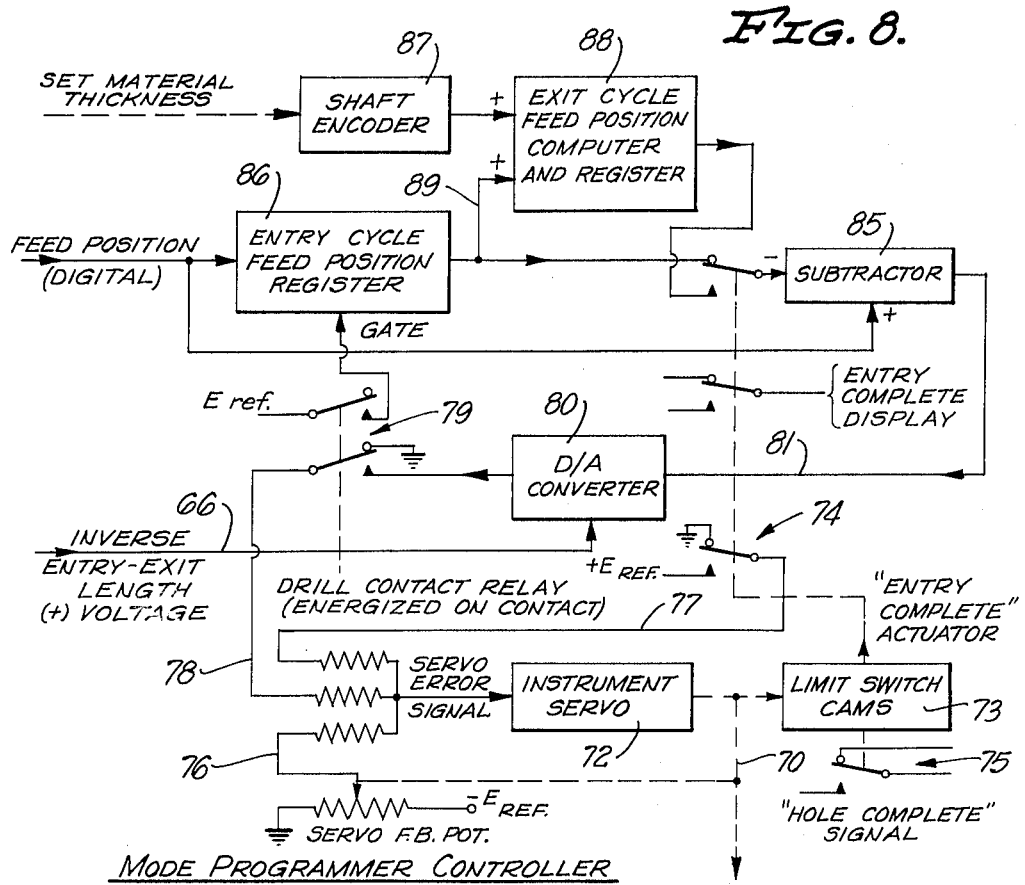
Figure 9:
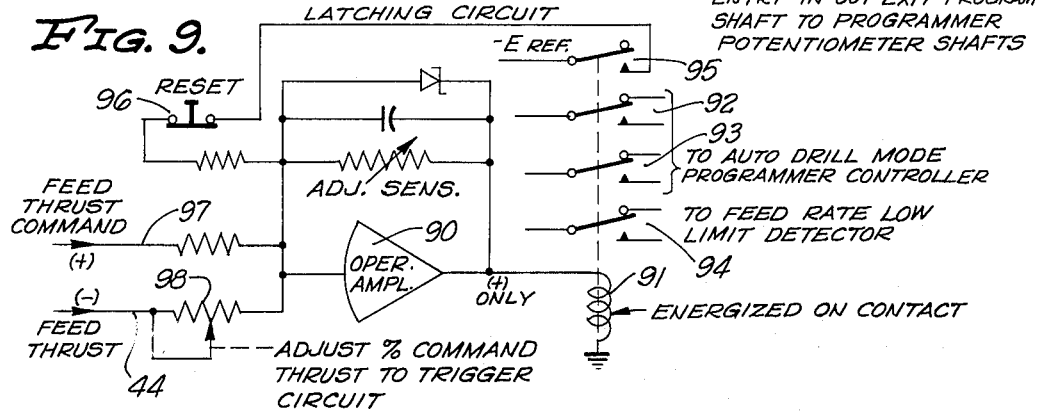

In the drawings:

FIGS. 1 and 1a diagrammatically illustrate a preferred embodiment of the metal working machine of the invention;

FIG. 2 is a diagram of the spindle control of FIG. 1a;
FIG. 3 is a graph illustrating the operation of the limiter of the spindle control of FIG. 2;
FIG. 4 is a diagram of the feed control of FIG. 1a;
FIG. 5 is a schematic of the retract cycle controls of FIG. 1;
FIG. 6 is a schematic of the manual drill mode controls of FIG. 1;
FIG. 7 is a schematic of the automatic drill mode controls and programmer of FIG. 1;
FIG. 8 is a diagram of the automatic drill mode programmer controller of FIG. 1;
FIG. 9 is a schematic of the drill contact detector of FIG. 1;
FIG. 10 is a schematic of the feed rate low limit detector of FIG. 1;
FIG. 11 is a diagram illustrating the operation of the drilling embodiment of the machine of the invention;
FIG. 12 is a diagram similar to that of FIG. 11 illustrating the operation of a conventional drilling machine;
FIG. 13 is a diagram illustrating the operation of a milling embodiment of the invention;
FIG. 14 is a diagram similar to that of FIG. 13 illustrating the operation of a conventional milling machine; and
FIG. 15 is a schematic of the manual feed-off-retract control of FIG. 1.

FIGS. 11 and 12 illustrate the operation of the drilling machine of the invention and of a conventional drilling machine, respectively, during the three stages of the drilling cycle. In the conventional machine, spindle velocity and feed velocity are set at predetermined values and the machine operates at these predetermined values during the entire drilling cycle. Spindle torque and feed thrust are not controlled. This operation is illustrated in the upper diagram of FIG. 12. When considered with reference to the actual cutting edge of the tool, these parameters vary considerably during the machining cycle, as illustrated in the lower diagram of FIG. 12. The cutting edge velocity, which may be measured in surface feet per minute, varies along the edge of a drill. The diagram indicates the maximum velocity which is determined at the maximum radius of the tool edge in contact with the work piece.

It has been determined that optimum machine performance may be achieved by controlling the force at the cutting edge (due to torque and thrust) and the velocity at the cutting edge throughout the cutting cycle. For a mill or other tool having a constant profile, the force at the cutting edge desirably is constant throughout the cutting cycle. For a drill or other tool having a varying profile, the force will vary, increasing as more of the edge engages the work piece during the entry stage, and will desirably be constant for the remainder of the cycle. This relationship is illustrated in the lower diagram of FIG. 11 and of FIG. 13. In a drilling operation, the edge velocity may be reduced as the tool breaks and during the exit stage to eliminate or reduce the burr and to reduce heat generation because the material available for heat conduction is being reduced. The feed velocity desirably increases during entry and decreases during exit because of the change in profile of the tool edge in contact. This is true also with mills because of the intermittent nature of the cutting action, but to a lesser degree. In order to achieve this performance at the cutting edge, the actual machine output must be varied and the machine output characteristics are illustrated in the upper diagram of FIG. 11. The machine output characteristics necessary to achieve the desired cutting edge performance for a particular tool profile, tool diameter and material machinability can be determined in advance and programmed for automatic operation of the machine. The predetermined program can be stored in various ways as in a digital computer memory, potentiometer banks, punch cards, or the like. The specific embodiment illustrated herein uses potentiometer banks for the storage of the programmed information.

The relationship shown between the upper and lower diagrams of FIG. 11 as well as the upper and lower diagrams of FIG. 12, assume a homogeneous material being worked. As this is rarely the case, automatic feedback control is utilized for automatically varying the actual machine output to maintain the desired performance at the cutting edge as nearly constant as possible when the tool encounters discontinuities and nonhomogeneities in the work piece.

The same considerations apply to a milling machine as for a drilling machine, with the difference in tool profile of the milling cutter and the drill resulting in a different spindle velocity characteristic for the actual machine in order to achieve the desired characteristics at the cutting edge. FIGS. 13 and 14 correspond to FIGS. 11 and 12 and illustrate the position of the milling cutter during the entry, incut and exit stages and the variations in the parameters in the same manner as discussed in conjunction with FIGS. 11 and 12.

FIGS. 1 and 1a illustrate a complete drilling machine incorporating the invention. A drill 20 is mounted in a chuck 21 carried at the end of a spindle 22. The spindle is driven in rotation by a spindle motor and is advanced along its axis by a feed motor coupled to the spindle by a drive unit 23. The spindle motor is driven from a spindle power controller and the feed motor is driven from a feed power controller.

A signal proportional to feed velocity or rate of advance of the spindle is produced at a feed velocity tachometer driven by the feed motor. A signal proportional to the axial position of the spindle is provided by a feed shaft angle sensor driven by the feed motor. Preferably the feed position signal from the shaft angle sensor is digital in form and is a measure of the actual position of the end of the drill. A signal proportional to feed thrust in the spindle is produced at a feed thrust sensor in the spindle. A signal proportional to spindle velocity or rotational velocity of the spindle is produced at a spindle velocity tachometer carried in the spindle. A signal proportional to spindle torque is produced at a spindle torque sensor carried in the spindle. Any conventional sensor may be used in generating the signals as described above.

The feed power controller for the feed motor is controlled by the feed servo control circuitry having as inputs feed thrust command, the feed thrust signal, the feed velocity signal, the feed velocity limit and the spindle-feed control interconnection signal. This circuitry is shown in greater detail in FIG. 4 and will be described hereinbelow. The spindle power controller for operating the spindle motor is controlled from the spindle servo control circuitry having spindle torque command, spindle torque signal, spindle velocity signal and spindle velocity limit as inputs. This circuitry is illustrated in greater detail in FIG. 2 and will be described hereinbelow.

The comands and limits may be provided by a manually set system or automatically and selection of the source of the commands and limits is achieved by a manual-automatic drill mode selector switch. The switch is shown in the automatic mode in FIG. 1. The commands and limits for manual mode are provided from a manual drill mode controls unit and the commands and limits for the automatic mode are provided from an automatic drill mode controls the programmer unit. When in the manual mode, the machine operates from manually programmed inputs, with the automatic feedback control as will be described. The maximum feed velocity, maximum spindle velocity, feed thrust, and torque-to-thrust ratio are manually set and can be manually varied during the cycle. The manual drill mode controls unit is illustrated in greater detail in FIG. 6 and the automatic drill mode controls and programmer unit is illustrated in greater detail in FIG. 7. These will be described hereinbelow.

The automatic drill mode controls and programmer unit is driven by an automatic drill mode programmer controller. The controller has as inputs the material thickness or desired depth of the hole to be drilled, the drill contact signal, the feed position signal and an entry-exit cycle length signal. The controller is illustrated in greater detail in FIG. 8 and will be described hereinbelow.

The drill contact detector provides the drill contact signal when the drill contacts the work piece in order to initiate operation of the programmed cycle. The detector is illustrated in detail in FIG. 9 and will be described hereinbelow. The feed-retract relay is illustrated in the feed position in FIG. 1 and is energized from the feed-off-retract control unit. The wire connection from the control unit to the relay is indicated by x—x on FIG. 1. When the feed-retract relay is energized, the feed thrust command produces advance of the drill. When the relay is de-energized, a retract thrust command from the retract cycle controls unit provides the command to the feed servo control circuitry. The retract cycle controls unit is shown in detail in FIG. 5 and will be described hereinbelow. The manual feed-off-retract control unit is shown in greater detail in FIG. 15 and will be described hereinbelow. A retract operation is called for when the hole is completed and when the feed rate falls below a predetermined limit. The feed rate low limit detector unit provides a safety feature, generating a low feed rate signal when for any reason the advance of the drill is less than a minimum determined by the feed velocity limit. The feed rate low limit detector unit is shown in detail in FIG. 10 and will be described hereinbelow.

We turn now to a consideration of the subsystem of FIG. 2 which includes the spindle servo control circuitry and the spindle power controller. A conventional four-way electrohydraulic servo valve 29 controls the flow of oil under pressure to the spindle motor 30 in response to output of the servo amplifier 31. The spindle torque signal on line 32 is provided by the torque transducer and amplifier 33 which corresponds to the torque sensor of FIG. 1a. The spindle velocity signal on line 34 is provided by the D.C. tachometer 35 which corresponds to the spindle tachometer of FIG. 1a. Under normal operating conditions, the input error signal to the servo amplifier is the difference between the spindle torque command and the spindle torque signal, the error signal being produced at the summing point 36. Under these conditions, the valve 29 is controlled to cause output torque of the motor 30 to very nearly equal the spindle torque command.

Velocity limiting may be utilized. If the load on the spindle is such that velocities exceeding the spindle velocity limit are required to obtain the command torque, the spindle velocity circuit becomes active. The difference between the spindle velocity limit and the spindle velocity signal appears on line 37 as the output of summing point 38 to provide an input to an analog limiter 39. The preferred characteristic of the analog limiter is shown in FIG. 3. The analog limiter circuit functions to reduce the torque command and thereby to reduce the actual spindle torque to a value which can be obtained at a spindle velocity in the range of 100% to 110% of the velocity limit.

The feed control subsystem of FIG. 4 includes the feed servo control circuitry and the feed power controller of FIG. 1a. The servo amplifier 40 provides an input to the power amplifier 41 for driving the feed motor 42 which functions to advance the spindle via the feed lead screw or drive unit 23 (FIG. 1a). The error signal input to the servo amplifier is the difference between the feed thrust command and the feed thrust signal which are the inputs to a summing unit 43. The feed thrust signal appears on line 44 as the output of the thrust force transducer and amplifier which corresponds to the feed thrust sensor of FIG. 1a. The servo system drives the motor 42 to cause the thrust at the spindle to vary nearly equal the feed thrust command. Velocity limiting is also incorporated in this unit with the feed thrust command being reduced when feed velocity or spindle velocity exceeds the respective limit. The feed velocity signal appears on line 46 being produced by tachometer 47 which corresponds to the feed velocity tachometer of FIG. 1a. The difference between the feed velocity limit and the feed velocity signal is provided as an input to the analog limiter 48 from a summing unit 49. A second input to the analog limiter is provided on line 50 and corresponds to the input to the analog limiter 39 of the spindle control unit of FIG. 2. This input is provided by the spindle-feed control interconnection so that when either feed velocity or spindle velocity exceeds the respective limit, there is a reduction in the thrust command. The characteristic of the analog limiter 48 is that illustrated in FIG. 3. A reduction in thrust will produce a reduction in feed velocity and also in spindle torque and spindle velocity because of interrelationships provided in the controls (see discussion of FIGS. 6 and 7 below).

The commands and limits which serve as inputs to the spindle control and feed control are electrical voltages and may be produced by connecting potentiometers or voltage dividers across reference voltage sources. Referring to FIG. 6, the manual drill mode controls unit utilizes potentiometers 50, 51, 52 which are connected as voltage dividers between a reference voltage and circuit ground. The feed thrust command is provided by the potentiometer 50 which may be manually set to the desired feed thrust. The feed velocity limit is provided by the potentiometer 51 which may be manually set to the maximum feed velocity for the particular operation. The spindle velocity limit is provided by the potentiometer 52 which may be set for the maximum spindle velocity. A potentiometer 53 is energized from the feed thrust signal which appears on line 44 (FIG. 4). The spindle torque command is produced at the arm of the potentiometer 53 and may be manually set to provide the desired torque-to-thrust ratio. As stated previously, the choice of operating the machine under manual controls or automatic controls is made by operation of the manual-automatic mode selector switch.

The automatic drill mode controls and programmer is shown in FIG. 7. The feed thrust command, the spindle torque command, the spindle velocity limit and the feed velocity limit are computed by the automatic programmer as functions of the stages of the drilling cycle and the actual feed thrust. The voltages for the feed thrust command, the spindle velocity limit and the feed velocity limit are derived from a reference voltage via a number of potentiometers functioning as voltage dividers. The voltage for the spindle torque command is derived from potentiometers which are energized from the feed thrust signal appearing on line 44. The drill diameter is fed into the programmer by manually adjusting three ganged potentiometers 55, 56, 57. The material hardness or machinability is set by manually adjusting a potentiometer 58. The drill angle or profile is set by manually adjusting a three-position, five-deck switch 59. In the embodiment illustrated, a setting for percent of maximum drilling speed is also provided and this is set by manually adjusting a potentiometer 60. While the machine normally would be operated at 100% of maximum drilling speed in order to achieve optimum performance, there may be situations when it is desirable from a timing standpoint to have the drilling operation take a longer period so that the operation can be synchronized with other operations, or if reduced tool wear is desired.

A set 62 of program potentiometers is provided for the feed thrust command. Sets 63, 64, 65 are provided for the spindle torque command, the spindle velocity limit, and the feed velocity limit respectively. The potentiometers of the feed thrust command set 62 are energized intermediate their end points via the arm of the potentiometer 55 and the arm of the potentiometer 58 and the potentiometer 60. The end points of the potentiometers are connected to circuit ground. The potentiometers of the spindle torque command set 63 are energized intermediate their end points from the feed thrust signal 44. The end points of the potentiometers are connected to circuit ground. One end of the potentiometers of the spindle velocity limit set 64 is energized from the arm of the potentiometer 56 and the arm of the potentiometer 58 and the potentiometer 60. The other end is connected to circuit ground. An intermediate point of the potentiometers of the feed velocity limit 60 is energized from the arm of the potentiometer 56 and the arm of the potentiometer 58 and the potentiometer 60. The ends of the potentiometers are connected to circuit ground. A signal is provided on the line 66 which is the inverse of the length of the entry and exit for the particular drill being utilized. The signal is produced at the arm of potentiometer 57 which in turn is energized from a deck of the drill point angle switch 59 with resistors 67, 68, 69 connected as a voltage divider. A separate set of program potentiometers is utilized for each of three drill point angles where the various commands and limits vary significantly with tool angle. Of course, fewer or more tool angle settings can be utilized, depending upon the characteristics of the tools to be operated with the machine. The potentiometers of the sets 62, 63, 64, 65 are driven in synchronism by a shaft 70 controlled by the programmer controller with the shaft position being related to the position of the drill in the work piece. With this arrangement, the actual values of the commands and limits can be varied as a function of relative position of drill and work piece so that the machine output called for varies to produce the desired constant performance at the cutting edge.

Referring now to the automatic load programmer controller of FIG. 8, an instrument servo 72 drives the output shaft 70 for the programmer potentiometers. The instrument servo also drives a group of limit switch cams indicated at 73. The instrument servo output provides a 360° output shaft rotation per drilling cycle. In a typical cycle, the 0 to 160° position would be the entry stage, the 160° to 180° position would be the incut stage, the 180° to 340° position would be the exit stage, and the 340° to 360° position would provide for end cut overtravel. One of the limit switch cams would actuate the entry complete switch 74 at the end of the entry stage and maintain the switch actuated during the incut and exit stages. Another of the limit switch cams would actuate the hole complete switch 75 after the exit stage is complete, returning the switch 75 to the unactuated position at the 0° position. The switches 74 and 75 are shown in the 0° position in FIG. 8.

Three inputs are provided to the instrument servo 72, including a feedback signal on line 76 from a feedback potentiometer driven by the servo output, a reference signal on line 77 and controlled by the entry complete switch 74, and a command signal on line 78.

The command line 78 is connected to circuit ground until the drill contacts the work piece, at which time the drill contact relay 79 is energized, connecting the line 78 to the output of a digital-to-analog converter 80. The converter has two inputs, one an analog voltage on line 66 which is a function of the length of the entry and exit travel required and the other on line 81 which is digital in form and a function of the axial travel of the spindle and drill. The feed position signal from the feed position transducer (FIG. 1a) is fed directly to a subtractor 85 and to an entry cycle feed position register 86. The register 86 is gated to hold the feed position by a reference voltage applied by the drill contact relay 99 on contact of the drill with the work piece. The register 86 then provides a second input to the subtractor 85 corresponding to the feed position at the start of the entry stage. The output of the subtractor is the difference of the two inputs.

A shaft encoder 87 provides a digital input to the exit cycle feed position computer and register 88 and is manually set to the thickness of the work piece. A second input to the computer register 88 is provided on line 89 and is the output of the register 86 corresponding to the feed position at drill contact. The output of the register 88 is the sum of the feed position at drill contact and the material thickness, which sum corresponds to the travel required for the entry and incut stages. At the end of the entry cycle on actuation of the entry complete switch 74, the output of the register 88 is substituted for the output of the register 86 as an input to the subtractor 85.

A drilling cycle is initiated by manual actuation of the feed-off-retract control to the "feed" position (FIGS. 1 and 15) and the spindle advances to contact the drill with the work piece. On contact with the work piece, the drill contact relay is energized and the position of the spindle (the feed position) is stored in the entry cycle feed position register 86. This value is provided as an input to the subtractor 85 and as an input to the exit cycle feed position computer and register 88. In the register 88, the feed position is added to the previously set material thickness. The output of the converter 80 provides an input to the servo 72 for driving the programmer shaft 70. During the entry stage the stored entry position from the register 86 is subtracted from the actual feed position and the resulting digital signal on line 81 is converted to analog form. The scale of this signal is set by the inverse entry-exit length signal appearing on line 66 from the programmer so that the output voltage of the converter 80 at the end of the entry stage is always equal to a certain value regardless of drill point angle and diameter. The instrument servo follows the command from the converter. When the entry stage is complete, the entry complete cam actuates switch 74 providing a reference input on line 77 to the instrument servo for driving the servo output through the incut stage to the zero point for the exit stage. In the example given, this provides the drive for the instrument servo between the 160° and 180° shaft positions. When the actual feed position matches the output of the register 88, the drill has completed the incut stage and is entering the exit stage. The output of the converter 80 now provides additional command to the servo, driving the shaft through the exit stage. At the end of the exit stage, actuation of the hole complete switch 70 by the cam indicates completion of the drilling cycle and initiates automatic drill retraction.

The drill contact detector is a device which senses the increase in thrust in the spindle on contact of the drill with the work piece and actuates a relay to provide various control functions. A typical circuit is shown in FIG. 9 and includes an operational amplifier 90 for driving a relay coil 91. The contact sets 92 and 93 are those illustrated at 79 in FIG. 8. The contact set 94 is utilized in the feed rate low limit detector (to be described). The contact set 95 provides a latching voltage for maintaining the relay energized once it is energized. A normally closed reset switch 96 is provided in the latching circuit for resetting the detector to the relay unenergized condition. The operational amplifier includes a feedback circut with a zener diode, a capacitor and a variable resistor in parallel with the variable resistor providing for adjusting the sensitivity of the circuit. The inputs to the detector circuit are the feed thrust command on the line 97 and the feed thrust signal from line 44. A variable resistor 98 in the feed thrust signal line provides for an adjustment of the actual feed thrust signal which will trigger the circuit to energize the relay coil 91.

The feed rate low limit detector senses the actual feed rate of the spindle and provides an output for actuating a relay when this rate falls below a predetermined proportion of the feed command. A preferred form of circuitry is shown in FIG. 10 and is quite similar to that of FIG. 9. An operational amplifier 100 provides for energizing the coil 101 of a low feed relay. A contact set 102 provides a latching voltage via a reset switch 103. A contact set 104 provides an output voltage for indication or other control purposes. Another contact set 105 is connected in the feed-off-retract control circuit of FIG. 15, to be described. The feedback circuit for the amplifier 100 is similar to that of the amplifier 90 of FIG. 9. The two inputs are the feed velocity limit on line 106 via the contact set 94 of the drill contact detector relay, and the feed velocity signal from the line 46. A variable resistor 107 provides for an adjustment of the percentage of command feed velocity at which the amplifier 100 will be triggered to energize the relay coil 101.

The manual feed-off-retract control provides for energizing the feed-retract relay of FIG. 1. A preferred form of this circuit is shown in FIG. 15 and includes a manually actuated three-position switch 110. When the switch 110 is turned from the off to the drill position, a drilling cycle is initiated and the machine retracts automatically at the completion of the drilling cycle. The machine can be caused to retract at any time by manually turning the switch 110 to the retract position. When the switch 110 is in the drill position, an energizing voltage is provided to the coil of the feed-retract relay through the switch 110, through the contact set 105 of the low feed rate relay, and through the contact set 75 of the limit switch cams. The contacts of the feed-retract relay are shown in the energized or feed position in FIG. 1. When the feed-retract relay is un-energized, the retract thrust command and retract velocity limit from the retract cycle controls are substituted for the corresponding command and limit from the manual or automatic drill mode controls. Also, during the retract mode of operation, the feed thrust command is substituted for the feed thrust signal as input to the drill mode controls to cause spindle operation at the limits during retraction.

The retract cycle controls (FIG. 1) provide the retract thrust command and the retract velocity limit for the retraction operation. Referring to FIG. 5, the retract thrust command may be provided at the arm of a potentiometer 120, which is set at the desired retract thrust value. The retract velocity limit may be provided at the arm of another potentiometer 121, which is set at the desired retract velocity limit.

In the operation of the machine, the desired feed thrust is determined in advance and is programmed in the potentiometer as the feed thrust command. The feed thrust command for the spindle itself varies as a function of the position of the tool in the work piece in order to provide the desired feed thrust at the cutting edge of the tool. Automatic feedback control is provided in the servo loop for maintaining the actual thrust nearly equal the command thrust. The spindle torque is also programmed as a predetermined proportion of the feed thrust. The ratio or proportionality factor varies as a function of the position of the tool in the work piece and is determined in advance for various drilling configurations and stored in the program potentiometer. Automatic feedback control is provided for maintaining the actual torque substantially equal to the command torque. The ratio of torque to thrust is programmed to maintain the unit force at the cutting edge constant throughout the cutting cycle.

Limiting for spindle velocity and feed velocity are provided in order to prevent operation of the machine above safe operating values. The cross connection between the spindle control and the feed control provides for maintaining a ratio of spindle velocity to feed velocity during the limiting operation.

The machine of the invention will provide wide variations in output of the spindle motor and of the feed motor during the cutting cycle for the purpose of maintaining predetermined conditions at the cutting edge which is doing the work. The advantages achieved with the machine include elimination of tool breakage, greatly increased tool life and simplified tool inventory, maximum productivity under various conditions and independent of operator skill; and minimization of effects of human error during operation.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

We claim as our invention:

1. In a metal working machine for moving a cutting tool through a work piece, the combination of:
   a spindle including means for carrying a cutting tool therein;
   first drive means for advancing said spindle;
   second drive means for rotating said spindle;
   means for sensing the torque of said spindle;
   means for sensing the advance feed thrust of said spindle;
   means for sensing the rotational velocity of said spindle;
   means for sensing the advance feed velocity of said spindle;
   first control means having the outputs of said feed thrust and feed velocity sensing means as inputs and providing an output to said first drive means for varying the output thereof to maintain the feed thrust substantially equal to a predetermined value; and
   second control means having the outputs of said torque and rotational velocity sensing means as inputs and providing an output to said second drive means for varying the output thereof to maintain the spindle torque substantially equal to a predetermined proportion of the feed thrust.

2. In a metal working machine for moving a cutting tool through a work piece during an operation cycle including entry, incut and exit stages, the combination of:
   a spindle including means for carrying a cutting tool therein;
   first drive means for advancing said spindle;
   second drive means for rotating said spindle;
   means for sensing the torque of said spindle;
   means for sensing the advance feed thrust of said spindle;
   means for sensing the rotational velocity of said spindle;
   means for sensing the advance feed velocity of said spindle;
   means for sensing the advance of said spindle to determine the entry, incut and exit stages;
   first control means having the outputs of said feed thrust and feed velocity sensing means as inputs and providing an output to said first drive means for varying the output thereof to maintain the feed thrust substantially equal to a predetermined thrust value;
   second control means having the outputs of said torque and rotational velocity sensing means as inputs and providing an output to said second drive means for varying the output thereof to maintain the spindle torque substantially equal to a predetermined proportion of the feed thrust; and
   third control means having the output of said spindle advance sensing means as an input for varying the predetermined thrust value and the predetermined proportion as functions of the stage of the operation cycle.

3. In a metal working machine for moving a cutting tool through a work piece during an operation cycle including entry, incut and exit stages, the combination of:
- a spindle including means for carrying a cutting tool therein;
- first drive means for advancing said spindle;
- second drive means for rotating said spindle;
- means for sensing the torque of said spindle;
- means for sensing the advance feed thrust of said spindle;
- means for sensing the rotational velocity of said spindle;
- means for sensing the advance feed velocity of said spindle;
- means for sensing the advance of said spindle to determine the entry, incut and exit stages;
- first control means having the outputs of said feed thrust and feed velocity sensing means as inputs and providing an output to said first drive means for varying the output thereof to maintain the feed thrust substantially equal to a predetermined thrust value;
- second control means having the outputs of said torque and rotational velocity sensing means as inputs and providing an output to said second drive means for varying the output thereof to maintain the spindle torque substantially equal to a predetermined proportion of the feed thrust;
- third control means having the output of said spindle advance sensing means as an input for varying the predetermined thrust value and the predetermined proportion as functions of the stage of the operation cycle;
- means for varying said thrust value as a function of tool diameter;
- means for varying said thrust value as a function of tool profile; and
- means for varying said thrust value as a function of the material to be cut.

4. In a metal working machine for moving a cutting tool through a work piece, the combination of:
- a spindle including means for carrying a cutting tool therein;
- first drive means for advancing said spindle;
- second drive means for rotating said spindle;
- means for sensing the torque of said spindle;
- means for sensing the advance feed thrust of said spindle;
- first control means having the ouptut of said feed thrust sensing means as an input and providing an output to said first drive means for varying the output thereof to maintain the feed thrust substantially equal to a predetermined value; and
- second control means having the output of said torque sensing means as an input and providing an output to said second drive means for varying the output thereof to maintain the spindle torque substantially equal to a predetermined proportion of the feed thrust.

5. In a metal working machine for moving a cutting tool through a work piece, the combination of:
- a spindle including means for carrying a cutting tool therein;
- first drive means for advancing said spindle;
- second drive means for rotating said spindle;
- means for sensing the torque of said spindle;
- means for sensing the advance feed thrust of said spindle;
- first control means having the output of said feed thrust sensing means as an input and providing an output to said first drive means for varying the output thereof to maintain the feed thrust substantially equal to a predetermined value; and
- second control means having the output of said torque sensing means as an input and providing on output to said second drive means for varying the output thereof to maintain the spindle torque substantially equal to a command value.

6. In a metal working machine for moving a cutting tool through a work piece during an operation cycle including entry, incut and exit stages, the combination of:
- a spindle including means for carrying a cutting tool therein;
- first drive means for advancing said spindle;
- second drive means for rotating said spindle;
- means for sensing the torque of said spindle;
- means for sensing the advance feed thrust of said spindle;
- means for sensing the advance of said spindle to determine the entry, incut and exit stages;
- first control means having the output of said feed thrust sensing means as an input and providing an output to said first drive means for varying the output thereof to maintain the feed thrust substantially equal to a predetermined thrust value;
- second control means having the output of said torque sensing means as an input and providing an output to said second drive means for varying the output thereof to maintain the spindle torque substantially equal to a command value; and
- third control means having the output of said spindle advance sensing means as an input for varying the predetermined thrust value and torque command value as a function of the stage of the operation cycle.

7. In a metal working machine for moving a cutting tool through a work piece during an operation cycle including entry, incut and exit stages, the combination of:
- a spindle including means for carrying a cutting tool therein;
- first drive means for advancing said spindle;
- second drive means for rotating said spindle;
- means for sensing the torque of said spindle;
- means for sensing the advance feed thrust of said spindle;
- means for sensing the advance of said spindle to determine the entry, incut and exit stages;
- first control means having the output of said feed thrust sensing means as an input and providing an output to said first drive means for varying the output thereof to maintain the feed thrust substantially equal to a predetermined thrust value;
- second control means having the output of said torque sensing means as an input and providing an output to said second drive means for varying the output thereof to maintain the spindle torque substantially equal to a predetermined proportion of the feed thrust; and
- third control means having the output of said spindle advance sensing means as an input for varying the predetermined thrust value and the predetermined proportion as functions of the stage of the operation cycle.

8. In a metal working machine for moving a cutting tool through a work piece, the combination of:
- a spindle including means for carrying a cutting tool therein;
- first drive means for advancing said spindle;
- second drive means for rotating said spindle;
- means for sensing the torque of said spindle;
- means for sensing the advance feed thrust of said spindle;
- means for sensing the rotational velocity of said spindle;
- means for sensing the advance feed velocity of said spindle;
- first control means having the outputs of said feed thrust and feed velocity sensing means as inputs and providing an output to said first drive means for varying the output thereof to maintain the feed thrust substantially equal to a predetermined thrust value, including means for limiting the first drive means output by reducing said thrust value as the feed velocity approaches a predetermined figure; and second control means having the outputs of said torque and rotational velocity sensing means as inputs and providing an output to said second drive means for varying the output thereof to maintain the spindle torque substantially equal to a torque value which is a predetermined proportion of the feed thrust, including means for limiting the second drive means output by reducing said torque value as the spindle velocity approaches a predetermined figure.

9. In a metal working machine for moving a cutting tool through a work piece during an operation cycle including entry, incut and exit stages, the combination of:

a spindle including means for carrying a cutting tool therein;

first drive means for advancing said spindle;

second drive means for rotating said spindle;

means for sensing the torque of said spindle;

means for sensing the advance feed thrust of said spindle;

means for sensing the rotational velocity of said spindle;

means for sensing the advance feed velocity of said spindle;

means for sensing the advance of said spindle to determine the entry, incut and exit stages;

first control means having the outputs of said feed thrust and feed velocity sensing means as inputs and providing an output to said first drive means for varying the output thereof to maintain the feed thrust substantially equal to a predetermined thrust value, including means for limiting the first drive means output by reducing said thrust value as the feed velocity approaches a predetermined figure;

second control means having the outputs of said torque and rotational velocity sensing means as inputs and providing an output to said second drive means for varying the output thereof to maintain the spindle torque substantially equal to a torque value which is a predetermined proportion of the feed thrust, including means for limiting the second drive means output by reducing said torque value as the spindle velocity approaches a predetermined figure; and third control means having the output of said spindle advance sensing means as an input for varying the predetermined thrust value and the predetermined proportion as functions of the stage of the operation cycle for providing substantially constant force at the cutting tool edge.

10. In a metal working machine for moving a cutting tool through a work piece, the combination of:

a spindle including means for carrying a cutting tool therein;

first drive means for advancing said spindle;

second drive means for rotating said spindle;

means for sensing the torque of said spindle;

means for sensing the advance feed thrust of said spindle;

first control means having the output of said feed thrust sensing means as an input and providing an output to said first drive means for varying the output thereof to maintain the feed thrust substantially equal to a predetermined thrust value;

second control means having the output of said torque sensing means as an input and providing an output to said second drive means for varying the output thereof to maintain the spindle torque substantially equal to a predetermined proportion of the feed thrust; and means for manually setting said thrust value and said torque-to-thrust proportion.

11. A machine as defined in claim 6 in which said third control means includes:

a first voltage divider having a reference voltage input and a moving arm output providing a thrust command signal proportional to said thrust value;

a second voltage divider having a thrust signal voltage input proportional to the feed thrust and a moving arm output providing a torque command signal;

means for driving said moving arms as a function of spindle advance;

means for varying said reference voltage as a function of tool diameter;

means for varying said reference voltage as a function of tool profile; and means for varying said reference voltage as a function of the material to be cut.

12. In a metal working machine for moving a cutting tool through a work piece during an operation cycle including entry, incut and exit stages, the combination of:

a spindle including means for carrying a cutting tool therein;

first drive means for advancing said spindle;

second drive means for rotating said spindle;

means for sensing the torque of said spindle;

means for sensing the advance feed thrust of said spindle;

means for sensing the advance of said spindle to determine the entry, incut and exit stages;

first control means having the output of said feed thrust sensing means as in input and providing an output to said first drive means for varying the output thereof to maintain the feed thrust substantially equal to a predetermined thrust value;

second control means having the output of said torque sensing means as an input and providing an output to said second drive means for varying the output thereof to maintain the spindle torque substantially equal to a command value; and third control means having the output of said spindle advance sensing means as an input for generating a signal corresponding to the predetermined thrust value and a signal corresponding to the torque command value with the signals varying as the tool moves through the work piece.

13. A machine as defined in claim 6 in which said means for sensing the advance of said spindle includes:

a reference for the distance of entry and exit;

a reference for the thickness of the work piece;

means for indicating contact of the tool and the work piece;

means for comparing spindle advance with said references;

an output member for driving said third control means; and means for driving said output member through one phase during the entry stage and through another phase during the exit stage.

14. In a metal working machine for moving a cutting tool through a work piece during an operation cycle entry, incut and exit stages, the combination of:

a spindle including means for carrying a cutting tool therein;

first drive means for advancing said spindle;

second drive means for rotating said spindle;

means for sensing the torque of said spindle;

means for sensing the advance feed thrust of said spindle;

means for sensing the advance of said spindle to determine the entry, incut and exit stages;

first control means having the output of said feed thrust sensing means as an input and providing an output to said first drive means for varying the output thereof to maintain the feed thrust substantially equal to a predetermined thrust value;

second control means having the output of said torque means as an input and providing an output to said second drive means for varying the output thereof to maintain the spindle torque substantially equal to a command value;

third control means having the output of said spindle advance sensing means as an input for varying the predetermined thrust value and torque command value as a function of the stage of the operation cycle;

a source of a negative thrust value; and a retract cycle switch for substituting said negative thrust value for said predetermined thrust value, said spindle advance sensing means including means for actuating said switch at the end of said exit stage.

15. In a metal working machine for moving a cutting tool through a work piece during an operation cycle including entry, incut and exit stages, the combination of:

a spindle including means for carrying a cutting tool therein;

first drive means for advancing said spindle;

second drive means for rotating said spindle;

means for sensing the torque of said spindle;

means for sensing the advance feed thrust of said spindle;

means for sensing the advance of said spindle to determine the entry, incut and exit stages;

means for generating a thrust value and a torque-to-thrust ratio to provide a controlled force at the tool cutting edge during entry, incut and exit stages;

first control means having the output of said feed thrust sensing means as an input and providing an output to said first drive means for varying the output thereof to maintain the feed thrust substantially equal to said thrust value; and second control means having the output of said torque sensing means as an input and providing an output to said second drive means for varying the output thereof to maintain the spindle torque substantially equal to said ratio of the feed thrust.

16. A method of machining material with a curvilinear tool including the steps of:

rotating the tool;

advancing the tool through the material;

maintaining the thrust of the tool advance drive substantially equal to a predetermined value; and maintaining the torque of the tool rotation drive substantially equal to a predetermined ratio with the thrust.

17. A method of machining material with a curvilinear tool including the steps of:

rotating the tool;

advancing the tool through the material during an operation cycle including entry, incut and exit stages;

maintaining the thrust of the tool advance drive substantially equal to a predetermined value;

maintaining the torque of the tool rotation drive substantially equal to a predetermined ratio with the thrust; and varying the predetermined thrust value and the predetermined ratio as functions of the stage of the operation cycle.

18. A method of machining material with a curvilinear tool including the steps of:

rotating the tool;

advancing the tool through the material;

maintaining the thrust of the tool advance drive substantially equal to a predetermined value;

maintaining the torque of the tool rotation drive substantially equal to a predetermined ratio with the thrust;

when the tool rotation velocity tends to exceed a predetermined maximum, reducing the torque requirement and the thrust requirement; and when the tool advance velocity tends to exceed a predetermined maximum, reducing the thrust requirement.

19. A method of machining material with a curvilinear tool including the steps of:

rotating the tool;

advancing the tool through the material; and controlling the tool advance drive and the tool rotation drive by varying the power supplied to the tool rotation drive and to the tool advance drive to maintain the thrust of the tool advance drive and the torque of the tool rotation drive substantially equal to predetermined values and thereby maintain the force at the tool cutting edge substantially constant per unit edge area in contact with the material.

References Cited by the Examiner

UNITED STATES PATENTS 2,905,441  9/1959  Poundstone _____ 77—32.7

WILLIAM W. DYER, Jr., *Primary Examiner.*

G. A. DOST, *Assistant Examiner.*

Notice of Adverse Decision in Interference

In Interference No. 95,812 involving Patent No. 3,259,023, R. F. Rieger, T. W. Schafer and I. D. Wells, METAL WORKING MACHINE AND MACHINING PROCESS, final judgment adverse to the patentees was rendered Apr. 26, 1968, as to claims 1, 4, 5, 10, 16, 17, 18 and 19.

[*Official Gazette July 2, 1968.*]